United States Patent [19]

Kitabayashi

[11] 4,138,845

[45] Feb. 13, 1979

[54] RECIPROCATING MOTORS

[76] Inventor: Seiichi Kitabayashi, No. 919-12 Koshikiya, Ageo-shi, Saitama, Japan

[21] Appl. No.: 820,193

[22] Filed: Jul. 29, 1977

[51] Int. Cl.² .................... F16D 31/02

[52] U.S. Cl. .................... 60/325; 60/398

[58] Field of Search .................... 60/398, 325, 327, 369, 60/506; 185/4, 27, 33; 417/332

[56] References Cited

U.S. PATENT DOCUMENTS

| | | | |
|---|---|---|---|
| 970,048 | 9/1910 | Harmon | 417/332 X |
| 3,991,563 | 11/1976 | Peun | 60/325 |

*Primary Examiner*—Edgar W. Geoghegan

*Attorney, Agent, or Firm*—Sughrue, Rothwell, Mion, Zinn and Macpeak

[57] ABSTRACT

A reciprocating motor comprises a reciprocating device composed of a vertical cylinder having a bottom opened to a water supply pipe provided with a valve and a piston having valve means which is opened to allow a downward movement of the piston by gravity and closed to allow an upward movement of the piston by water pressure, a pumping device composed of at least a pair of piled annular tanks provided with valves to allow selective communication between the tanks or between the cylinder and the tank, means provided with valves to allow selective communication between either tank and a pressure source and relay switch means for operating the valves in sequence.

3 Claims, 5 Drawing Figures

RECIPROCATING MOTORS

BACKGROUND OF THE INVENTION

This invention relates to a reciprocating motor, and particularly to a reciprocating motor to be dipped in water or the like to utilize potential energy of water for producing a reciprocating motion.

DESCRIPTION OF THE PRIOR ART

The conventional reciprocating motor is exemplified by Japanese Patent Application Public Disclosure No. 51-37347, in which potential energy of water is utilized as a power source for converting water pressure into reciprocating motion. Further, the utilization of kinetic energy of water is exemplified by Japanese Patent Application Public Disclosure No. 51-56445, in which wave energy is converted into reciprocating motions of a plurality of pistons. However, the power which can be derived from the latter is relatively small in comparison with the motor utilizing the potential energy of water.

In the conventional reciprocating motor utilizing the potential energy of water, however, difficulties have been often experienced in draining of water whose potential or kinetic energy is lost. For example, since it is necessary to drain used water at short periods of time, a powerful pump apparatus is necessary.

SUMMARY OF THE INVENTION

A primary object of the present invention is to provide an improved reciprocating motor utilizing potential energy of water.

Another object of the present invention is to provide an improved reciprocating motor suitable to be installed in a sea or the like.

A further object of the present invention is to provide an improved reciprocating motor which including a water pump capable of operating with relative small power consumption.

DETAILED DESCRIPTION OF THE PREFERRED EMBODIMENT

The present invention will be described under an assumption that the present apparatus is installed on a bottom of sea. It should be noted, however, that the present apparatus can also be installed at any place where a water pressure is constant.

Figure 1:
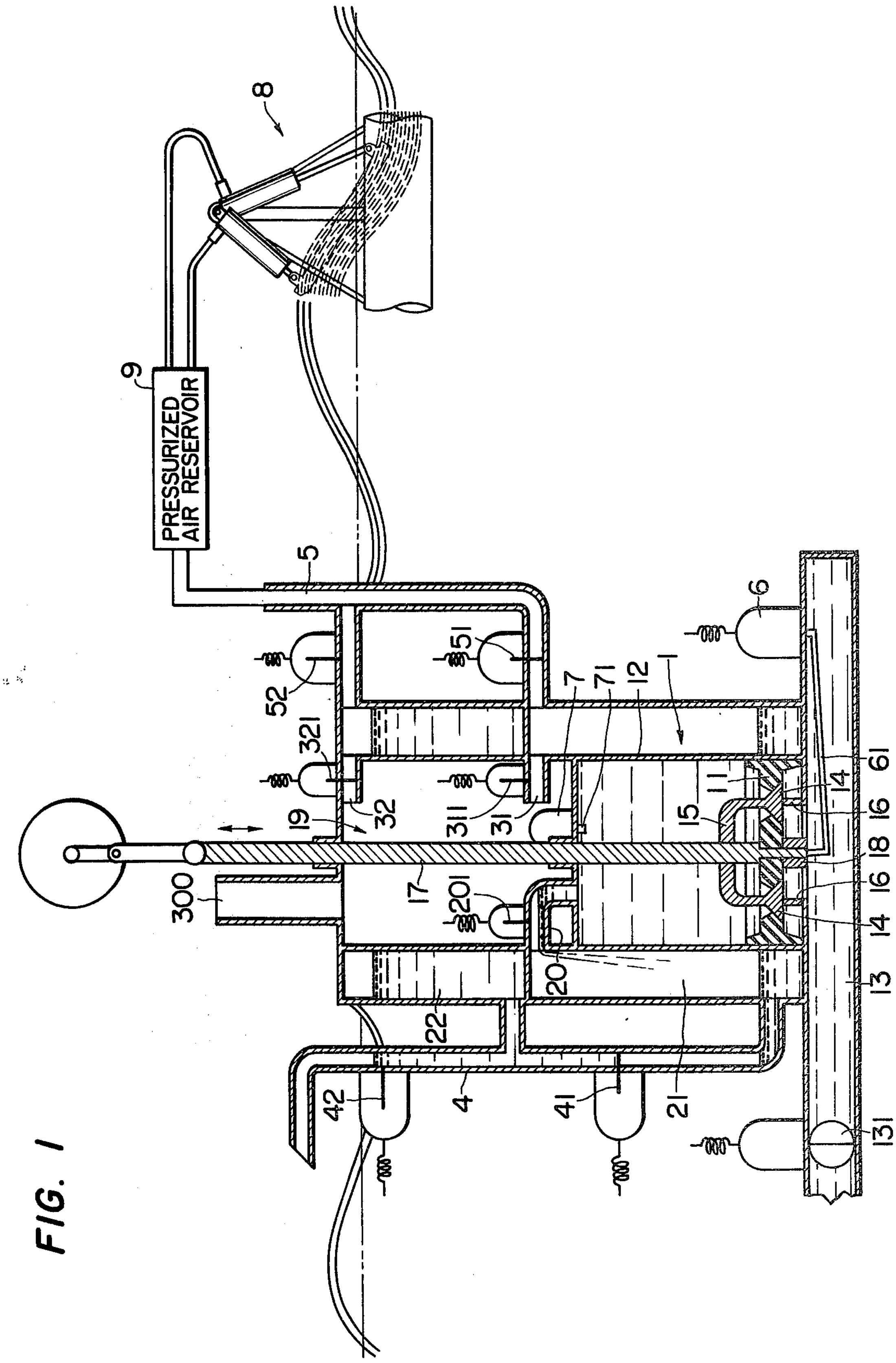
FIG. 1 is a vertical cross section of an embodiment of a reciprocating motor according to the present invention illustrating the operation thereof wherein a piston is at the lowermost position.
Figure 2:
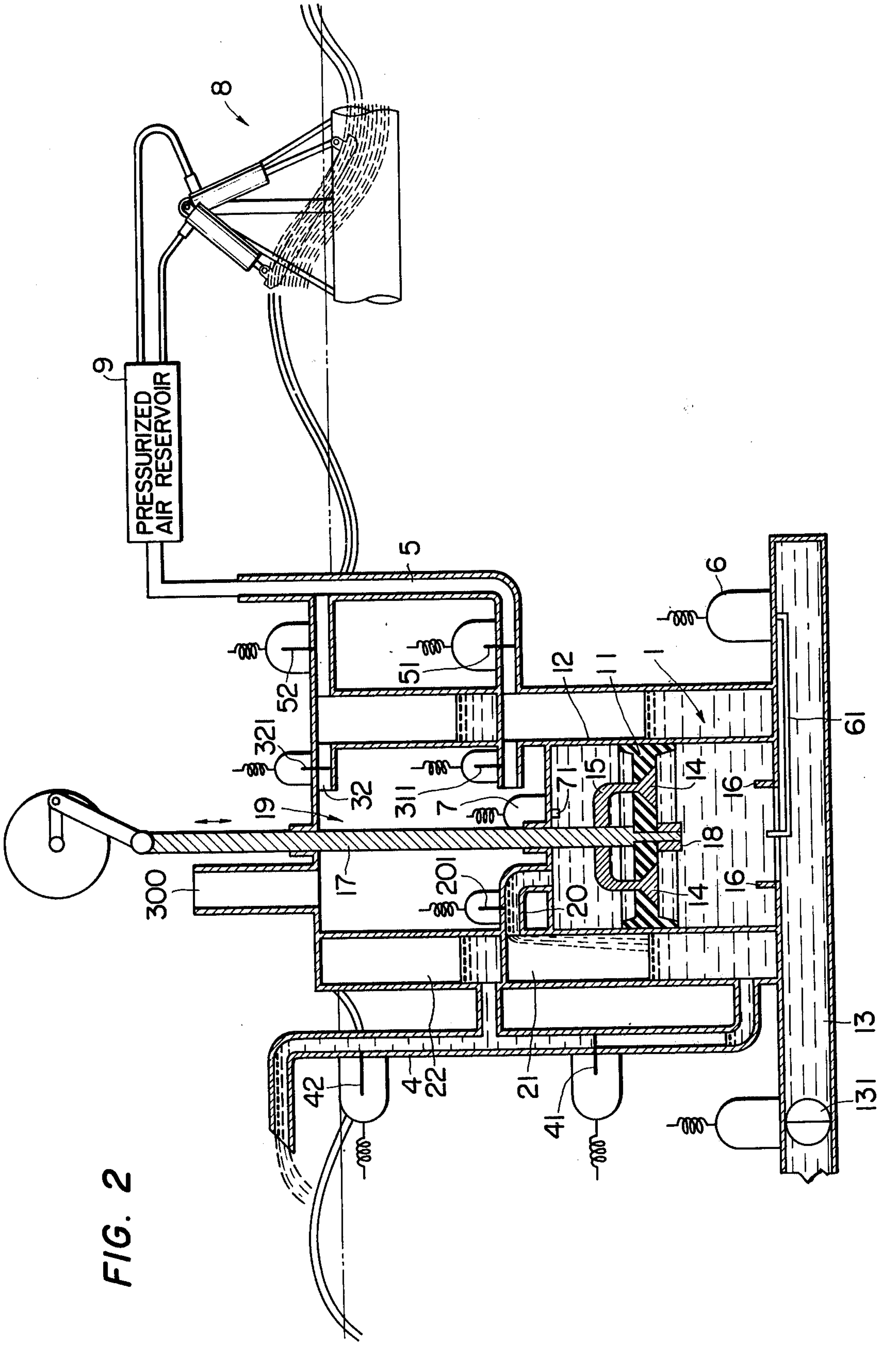
FIG. 2 is a similar view to FIG. 1 wherein the piston is being pushed upwardly.
Figure 3:
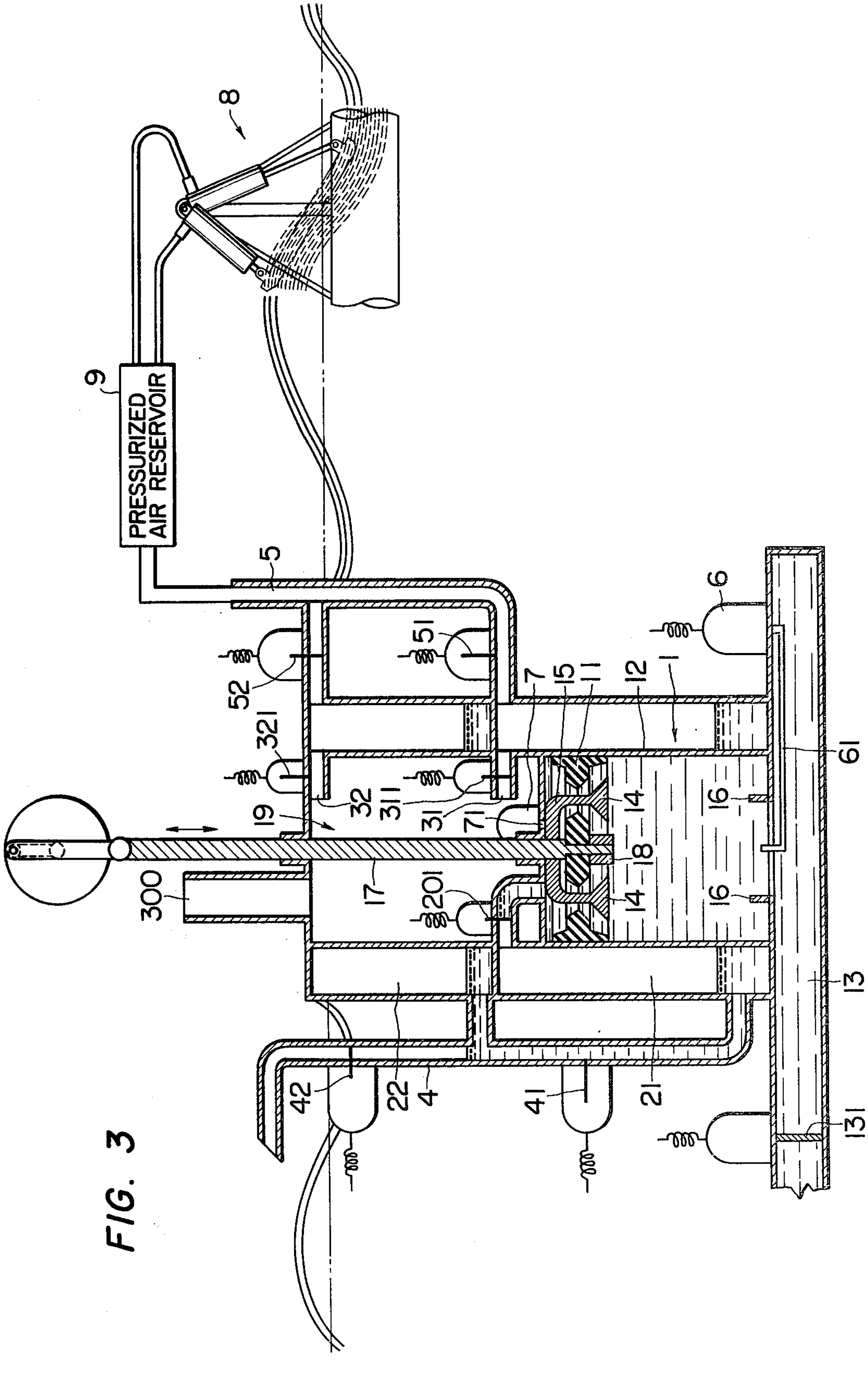
FIG. 3 is a similar view to FIG. 1 wherein the piston is at the uppermost position.

FIGS. 1 through 3 are vertical cross sectional views of an embodiment of a reciprocating piston type motor according to the present invention.

Referring to FIG. 1, the apparatus includes in a lower portion thereof a vertical cylinder 12 having a bottom formed with an opening opened to a normally closed water supply pipe 13 provided with a normally closed water supply valve 131 for controlling a water running into the vertical cylinder. At least one pair of upward protrusions 16 are provided on the periphery of the opening of the cylinder bottom for a purpose to be described later. The cylinder 12 has a piston 11 to which a piston rod 17 is connected. An upper end of the rod 17 is connected to a utilization means such as crank mechanism etc., so that the reciprocating motion of the rod 17 can be easily used for a power source. The piston 11 is formed, at a center of a lower surface thereof, with a downward protrusion 18 for a purpose to be described later. The piston 11 is further formed with a pair of downwardly tapered valve holes. A pair of valve members 14 connected together by a connecting rod 15 having a generally reversed U-shape are associated with the valve holes of the piston 11. The valve members 14 are slidable downwardly with respect to the valve holes of the piston 11 by gravity when the piston is in an intermediate position during its downward stroke movement. When the piston 11 is at around the lower dead end position thereof during its downward stroke, the valve members 14 contact with the upward protrusions 16 extending upwardly from the lower inside wall of the cylinder 12 and are pushed upwardly to close the valve holes of the piston 11 completely. During the upward stroke of the piston 11, the valve members 14 are held in position to close the valve holes by water pressure applied to the lower side of the valve members 14 so that the piston can perform its upward stroke by the water pressure applied to the lower side of the piston and lower side of valve members 14.

The upper end wall of the cylinder 12 is formed with an opening which is connected through a pipe 20 to an annular base tank 21 provided around the cylinder 12. The pipe 20 is provided with a normally closed water valve 20. In this embodiment, a plurality of the annular tanks are piled on annular base tank 21 and only one (22) of the annular tanks are shown in FIG. 1 as piled on the tank 21. These tanks 21 and 22 are communicated with each other at lower end portions via a water communicating pipe 4 having an upper end opened for draining water and these tanks 21 and 22 are also communicated with each other at upper end portions thereof via an air communicating pipe 5 having an upper end connected to a suitable air pressure source such as a pump. In FIG. 1, the pressure source takes the form of a pump such as disclosed in Japanese Patent Application No. 51-56445 which utilizes wave energy to compress air by a seesaw buoy.

The water communicating pipe 4 is provided with normally closed water valves 41 and 42 between the tanks 21 and 22 and between the tank 22 and the outlet, respectively. The air communicating pipe 5 is provided with normally closed air valves 51 and 52 each between the tank and the air pressure source 8.

Exhaust pipes 31 and 32 are provided at upper end portions of inner side walls of the tanks, which communicate through normally closed exhaust valves 311 and 321 respectively with an inner space 19 defined by the inner side walls of the tanks and the upper wall of the cylinder 12. The space in turn communicates with atmosphere through an exhaust aperture 300 provided at the top portion of the inner space 19.

A relay switch 6 is provided at a suitable position. The switch 6 is provided with an actuator 61 a free end of which is capable of being operated by a downward protrusion 18 provided at the center of the bottom surface of the piston 11 at the lower position of the piston 11 to actuate the relay switch. The relay switch 6 when actuated serves to control the valves. Another relay switch 7 is provided on the upper wall of the cylinder. The switch 7 is provided with a downwardly extending actuator 71 which is operated by an upper portion of the U-shaped connecting rod 15 at the upper dead end position of the piston 11. The relay switches 6 and 7 serve to control all of the previously described valves in sequence. These valves may be electromagnetic valves which can be electrically operated.

Figure 4:
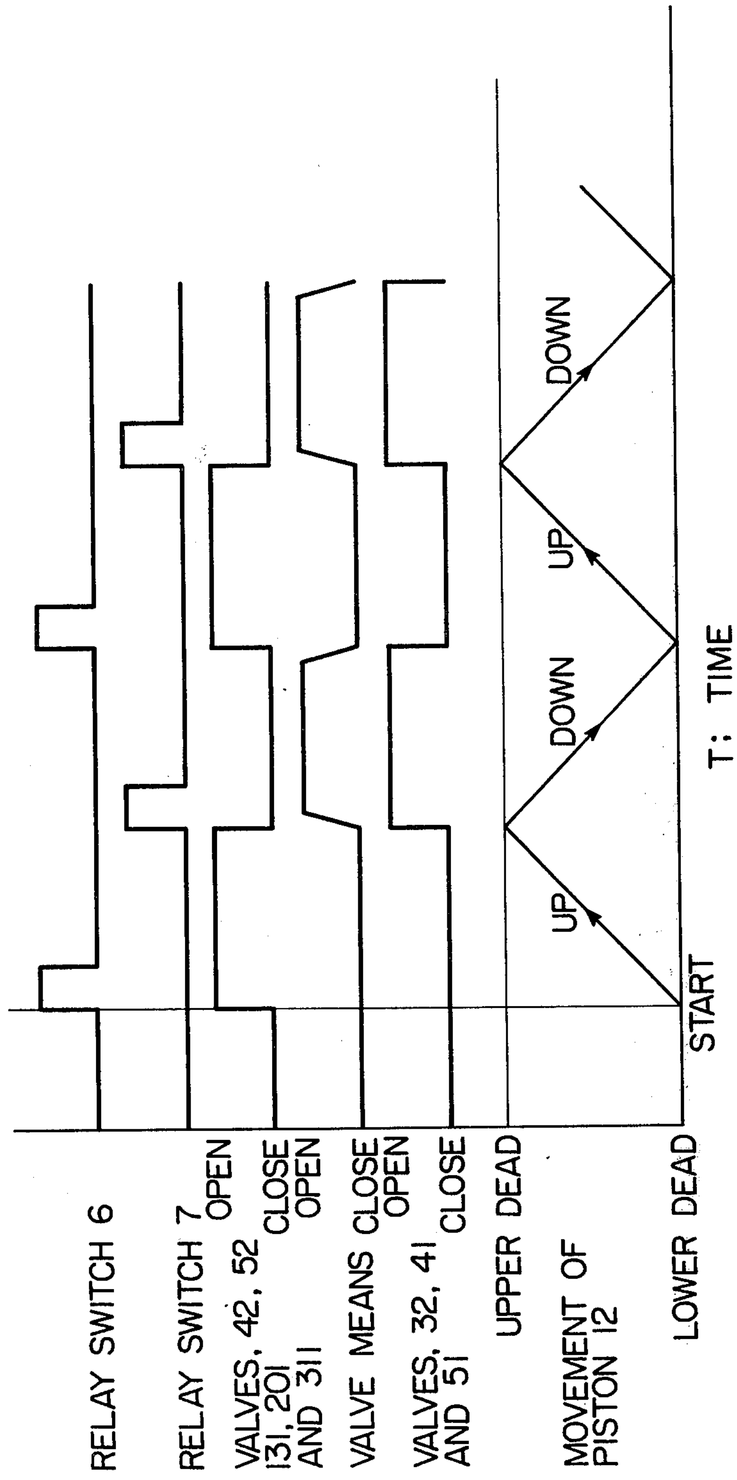
FIG. 4 shows a time chart showing relative operations or the valve provided in the motor according to the present invention.

In operation, when the piston 11 is at around the lower position thereof, the downwardly extending protrusion 18 extending from the bottom surface of the piston 11 contacts with the actuator 61 of the relay switch 6 so as to actuate the relay switch 6. Upon the actuation of the relay switch 6, the water supply valve 131, the water valves 201 and 42, the exhaust valve 311 and the air valve 52 are opened, respectively as shown in FIG. 4 which is a time chart showing the operational relation between the relay switches and the valves.

Since, at that time the piston 11 is at the lower position due to gravity and the valves 14 are closed by the protrusions 16, water supplied through the opened valve 131 applies a pressure to the lower side of the piston 11 causing it to move upwardly. Water existing in the cylinder 12 at this time is exhausted through the valve 201 into annular bare tank 21.

At the end of the upward stroke of the piston 11, the connecting rod 15 contacts with the actuator 71 of the relay switch 7 and the relay switch 7 provides a signal by which the valves 131, 201, 311, 42 and 52 are closed and valves 41, 51 and 321 are opened. Simultaneously therewith the connecting rod and hence the valve members 14 are kicked down by the reaction force to open the valve holes in the piston 11. Therefore, the water which has been pushing upwardly on the piston is relieved through the holes in the piston 11 and, therefore, the latter commences a downward stroke by gravity during which the valves 14 are kept opened. The water is thus transferred to the upper side of the piston 11 and, at the lower position of the piston 11, it fills in the cylinder 12 as shown in FIG. 1.

In the next upward stroke of the piston, the water which has already filled in the space above the piston 11 in the cylinder 12, is drained to the tank 21 through the pipe 20 with the water valve 201 opened as shown in FIG. 2.

Air in the tank 21, whose amount substantially corresponds to that of the drained water, is exhausted through the exhaust pipe 31 through the opened exhaust valve 311. The water drained through the valve 201 into the tank 21 is pushed into the pipe 4 by air pressure supplied through the valve 51 to the tank 21 during the downward stroke of the piston 11 and also enters into the tank 22 through valve 52.

The water thus lifted up from the tank 21 to the tank 22 during the downward stroke of the piston 11, is further pushed up by air pressure during a next upward stroke of the piston and drained through the valve 42.

Referring to FIG. 3, when the piston 11 is raised to its upper position, the U-shaped connecting rod 15 of the valve member 14 contacts again with the actuator 71 of the relay switch 7 to actuate the relay switch 7.

Therefore, the reciprocal movement of the piston continues automatically so long as the valves are appropriately controlled by the switches. In the present apparatus, only the electromagnetic valves consume electric power and therefore, electric power consumption is extremely small.

While the present invention has been shown and described specifically with only one annular tank 22 piled on the base tank 21, there is no intent to limit the spirit and scope of the invention to this tank construction and it will be understood that the like pumping function can also be obtained by providing further a plurality of tanks to be piled thereon.

Figure 5:
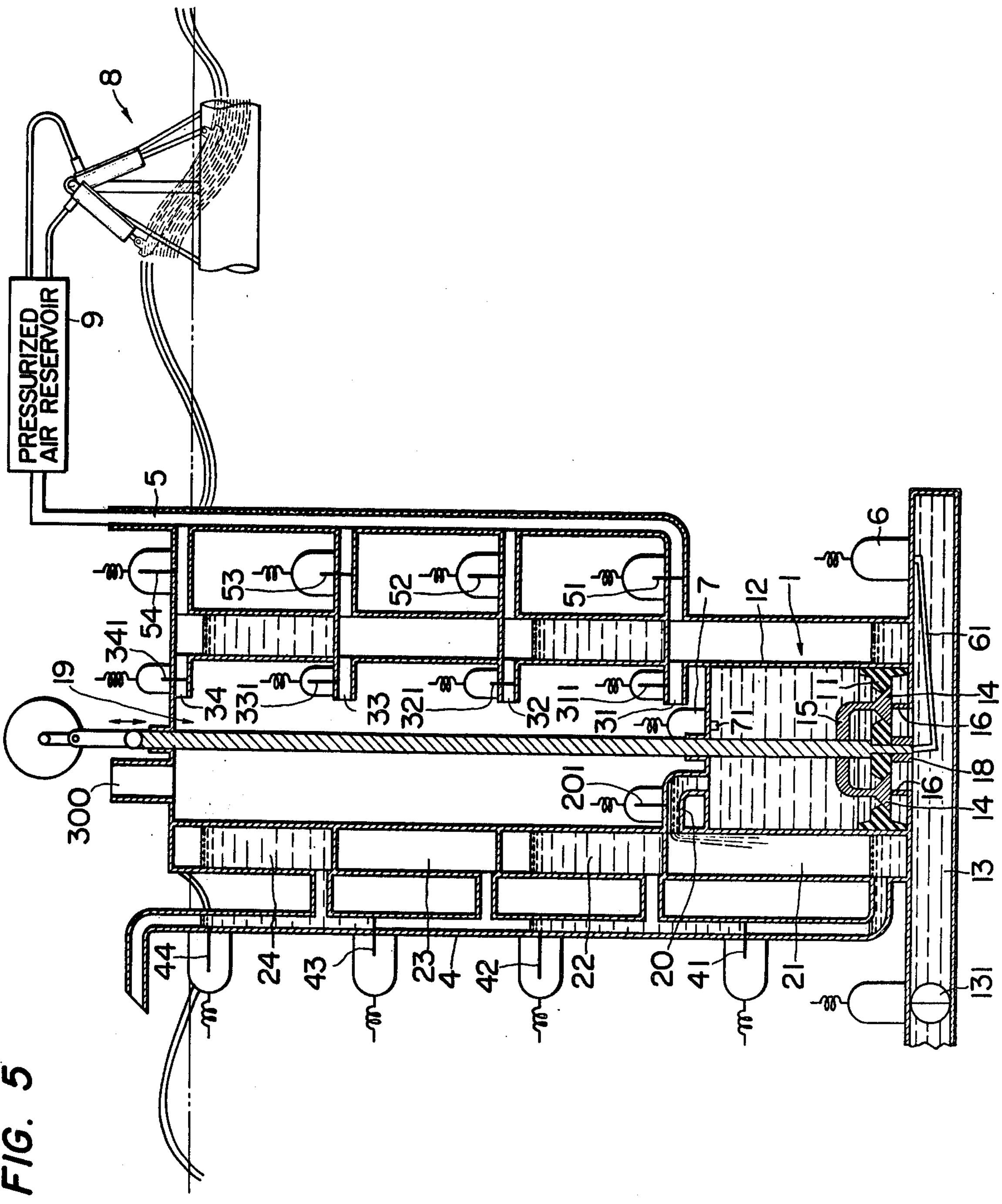
FIG. 5 is a vertical cross section of another embodiment of the reciprocating motor according to the present invention illustrating the operation thereof wherein the piston is at the lowermost position.

For example, three annular tanks 22, 23 and 24, in the other embodiment as shown in FIG. 5, are piled on the base annular tank 21. In operation, since valves attached to the annular tank 23 correspond to those attached to the base tank 21, respectively, they are operated in an identical manner to the operation of the valves attached to the annular tank 21 in the modification previously described. Further, valves attached to the annular tank 24 also correspond to those attached to the annular tank 2, and they are thus operated in an identical manner to the operation of the valves attached to the annular tank 22 in the previously described modification.

In this case, if the apparatus shown in FIG. 5 is installed at the same depth as that shown in FIGS. 1 to 3 is installed, the capacity of the air pressure source utilized in the embodiment shown in FIG. 5 may be smaller than that utilized in the embodiment shown in FIGS. 1 to 3. Consequently, the greater the number of annular tanks piled on the base tank 21, the more the value of the air pressure required for lifting the water filled in the lower tank up to the adjacent higher tank is decreased.

What is claimed is;

1. A reciprocating apparatus driven by static water pressure, comprising, (A) a reciprocating device forming a lower portion of said reciprocating apparatus, said reciprocating device being composed of;

(a) a vertical cylinder having a bottom opened to a first water pipe provided with a first water valve for controlling water running into said vertical cylinder;

(b) a piston having at least one valve hole and slidably disposed in said vertical cylinder, said valve hole being capable of being opened at an upper dead end position of said piston and held open during downward stroke thereof and closed at a lower position; and (c) an axial connecting member having a lower end connected to said piston and an upper end connected to a utilization means;

(B) a pumping device composed of;

(a) at least two annular tanks axially adjacent one another and surrounding said cylinder, the lowermost one of said tanks is communicated with an upper end portion of said cylinder via a second water pipe provided with a second water valve;

(b) a manifold water pipe having one end opened to atmosphere and the other end branched to two branches each connected to a bottom portion of each of said tanks, said manifold water pipe being further provided with two third water valves to establish a selective water communication between said tanks or between said uppermost tank and said one end, respectively; and (c) a manifold air pipe having one end connected to an air pressure source and the other end branched to two branches each connected to an upper portion of each of said tanks, said manifold air pipe being provided with two first air valves each to allow a selective air communicating between each of said tanks and said pressure source and two second air valves to allow a selective air communication between each of said tanks and atmosphere;

(C) control means for detecting the position of said piston in said cylinder to open said first, said second and one of said third water valves disposed between atmosphere and said upper tank, and said first air valve connected to said upper tank and said second air valve connected to said lower tank when said piston is at the lower position, and to close said first, said second and one of said third water valves disposed between atmosphere and said upper tank, and said first air valve connected to said upper tank and said second air valve connected to said lower tank and open one of said third water valves disposed between said upper and lower tanks, and said first air valve connected to said lower tank and said second air valve connected to said upper tank when said piston is positioned at said upper dead end position.

2. A reciprocating motor as defined in claim 1, wherein said piston is capable of sliding upwardly with respect to said vertical cylinder by an application of pressurized water through said first water pipe and sliding downwardly by gravity.

3. A reciprocating motor as defined in claim 1, wherein said control means comprises a first relay switch means having a first actuator actuated by said piston at the lower position thereof to open said first, said second and one of said third water valves disposed between atmosphere and said upper tank, said first air valve connected to said upper tank and said second air valve connected to said lower tank and close one of said third water valves disposed between said upper and lower tanks, said first air valve connected to said lower tank and said second air valve connected to said upper tank and a second delay switch means having a second actuator actuated by a valve means associated with said valve holes of said piston at the upper position thereof to open one of said third water valves disposed between said upper and lower tanks, said first air valve connected to said lower tank and said second air valve connected to said upper tank and close said first, said second and one of said third water valves disposed between atmosphere and said upper tank, said first air valve connected to said upper tank and said second air valve connected to said lower tank.

* * * * *